United States Patent [19]

Sako et al.

[11] Patent Number: 5,777,192

[45] Date of Patent: Jul. 7, 1998

[54] METHOD OF DECOMPOSING POLYCHLORODIBENZO-P-DIOXINS AND/OR POLYCHLORODIBENZOFURANS

[75] Inventors: Takeshi Sako; Masahito Sato; Tsutomu Sugeta; Katsuto Otake, all of Tsukuba; Masayuki Tsugumi, Tokyo, all of Japan

[73] Assignee: Director-General of Agency of Industrial Science and Technology, Japan

[21] Appl. No.: 822,703

[22] Filed: Mar. 21, 1997

[30] Foreign Application Priority Data

Jun. 10, 1996 [JP] Japan ................. 8-146940

[51] Int. Cl.⁶ ............... A62D 3/00; C02F 1/68; F23J 3/00
[52] U.S. Cl. ............... 588/208; 210/761; 210/762; 588/207; 588/213; 588/256; 110/344
[58] Field of Search ............... 210/761, 762; 588/205, 206, 209, 213, 223, 208, 256; 110/344, 345

[56] References Cited

U.S. PATENT DOCUMENTS

| 4,338,199 | 7/1982 | Modell | 210/761 |
|---|---|---|---|
| 4,822,497 | 4/1989 | Hong et al. | 210/761 |
| 5,075,017 | 12/1991 | Hossain et al. | 210/761 |
| 5,232,604 | 8/1993 | Swallow et al. | 210/761 |
| 5,384,051 | 1/1995 | McGuinness | 588/213 |
| 5,543,057 | 8/1996 | Whiting et al. | 210/761 |
| 5,558,783 | 9/1996 | McGuinness | 588/213 |
| 5,560,822 | 10/1996 | Bond et al. | 210/205 |

*Primary Examiner*—Gary P. Straub
*Attorney, Agent, or Firm*—Lorusso & Loud

[57] ABSTRACT

A method of decomposing dioxin compounds, such as polychlorodibenzo-p-dioxins and polychlorodibenzofurans, contained in a waste material into unharmful substances, wherein the waste material is treated with a supercritical water at a temperature higher than the critical temperature of water and a pressure higher than the critical pressure of water.

6 Claims, No Drawings

METHOD OF DECOMPOSING POLYCHLORODIBENZO-P-DIOXINS AND/OR POLYCHLORODIBENZOFURANS

BACKGROUND OF THE INVENTION

This invention relates to a method of converting polychlorodibenzo-p-dioxins and/or polychlorodibenzofurans into unharmful substances.

Recently, dioxins such as polychlorodibenzo-p-dioxins and polychlorodibenzofurans were reported as being harmful to human bodies for their acute toxicity and carcinogenic properties. Dioxins are discharged typically from incineration systems for industrial and municipal wastes such as slugs, waste oils, exhaust gases, waste water, etc. Since dioxins are chemically stable, they accumulate in the earth environment especially in soils year by year. The formation of dioxins can be minimized by completely burning wastes. However, in order to completely burn wastes, it is necessary to keep a high combustion temperature (generally above 1,073 K) for a long residence time with stirring. However, from the standpoint of technology and economy, such a complete combustion cannot be practiced on a large scale.

The following methods have been proposed to decompose dioxins:

(1) A thermal method in which inorganic powder containing dioxins is heated in a low oxygen-deficient atmosphere to dechlorinate and hydrogenate the dioxins;

(2) A photochemical method in which inorganic powder containing dioxins is irradiated with UV or sunlight to dechlorinate and decompose the dioxins;

(3) A biological method in which powder containing dioxins is treated with bacteria in the presence of a decomposition promoting solvent such as ethyl acetate to decompose the dioxins.

The known methods, however, are not fully satisfactory. The thermal method has a problem because dioxins are apt to be newly produced during heat treatment when the oxygen content in the treatment atmosphere increases. The photochemical and biological methods have a problem because a long treatment time is required. Further, the biological treatment requires adjustment of the pH, temperature and the like conditions.

SUMMARY OF THE INVENTION

It is an object of the present invention to provide a simple method which can efficiently convert dioxins contained in a waste material such as an ash or fly ash into unharmful substances within a short period of time.

In accordance with the present invention there is provided a method of decomposing dioxin compounds contained in a waste material, comprising treating said waste material with a supercritical water at a temperature higher than the critical temperature of water and a pressure higher than the critical pressure of water.

Other objects, features and advantages of the present invention will become apparent from the detailed description of the preferred embodiments to follow.

DETAILED DESCRIPTION OF THE PREFERRED EMBODIMENTS OF THE INVENTION

Any dioxin-containing waste material may be treated in accordance with the present invention. Generally, dioxins are contained in a relatively high concentration in combustion residues (ashes), fly ash and waste gas absorbents (e.g. activated carbon, alumina and titania). Such solid waste materials in the form of powder are suitably treated by the method of the present invention.

The dioxin-containing material is fed to a reactor and is heated together with water at a temperature higher than the critical temperature of water, i.e. at a temperature higher than 647.3 K, preferably 653–873 K, more preferably 653–773 K, and at a pressure higher than the critical pressure of water, i.e. at a pressure higher than 22.12 MPa, preferably 22.12–40 MPa, more preferably 25–35 MPa. The treatment time is generally 5–60 minutes, preferably 10–40 minutes.

To improve the dioxin decomposition efficiency, it is preferred that the heat treatment be performed in the presence of an oxidizing agent such as hydrogen peroxide or an oxygen-containing gas. The amount of the oxidizing agent is generally 5–5,000 moles, preferably 10–1,000 moles, per mole of the dioxin compound.

The amount of water present in the reactor is generally 2–10 parts by weight, preferably 3–7 parts by weight, per part by weight of the dioxin-containing material so that the dioxin-containing material can be dispersed in water in a stable manner.

After completion of the decomposition treatment, the reaction mixture is separated into a solid phase and an aqueous phase. The aqueous phase can be recycled to the reactor for the decomposition of fresh dioxin-containing material.

The following examples will further illustrate the present invention.

EXAMPLE 1

A fly ash sample containing polychlorodibenzo-p-dioxins and polychlorodibenzofurans in amounts (per g of the sample) shown in Table 1 below was treated. Thus, the sample and water in amounts shown in Table 2 were charged in a reactor and heated at a temperature and a pressure as shown in Table 2 for a period of time as shown in Table 2. The reaction mixture was then analyzed for the amounts of polychlorodibenzo-p-dioxins and polychlorodibenzofurans to give the results summarized in Table 3. As a result of the 15 minutes heat treatment with supercritical water, 96.8% of the dioxins were decomposed.

TABLE 1

| Dioxin Compounds (abbreviation) | Amount (ng/g) |
| --- | --- |
| Tetrachlorodibenzoparadioxin (T4CDD) | 2.0 |
| Pentachlorodibenzoparadioxin (P5CDD) | 5.896 |
| Hexachlorodibenzoparadioxin (H6CDD) | 12.1 |
| Heptachlorodibenzoparadioxin (H7CDD) | 34 |
| Octachlorodibenzoparadioxin (O8CDD) | 38 |
| Polychlorodibenzoparadioxins (PCDD) | 92 |
| Tetrachlorodibenzofuran (T4CDF) | 5.51 |
| Pentachlorodibenzofuran (O5CDF) | 8.7 |
| Hexachlorodibenzofuran (H6CDF) | 2.66 |
| Heptachlorodibenzofuran (H7CDF) | 38 |
| Octachlorodibenzofuran (O8CDF) | 37 |
| Polychlorodibenzofurans (PCDF) | 92 |
| Total dioxin compounds PCDD + PCDF | 184 |

EXAMPLE 2

Example 1 was repeated in substantially the same manner as described except that the treatment time was increased to 30 minutes. The treatment conditions and the results are summarized in Tables 2 and 3, respectively. The decomposition efficiency was found to increase to 97.4%.

EXAMPLE 3

Example 2 was repeated in substantially the same manner as described except that 7.3 g of a 0.02% by weight aqueous hydrogen peroxide solution as an oxidizing agent was additionally incorporated into the reactor. The treatment conditions and the results are summarized in Tables 2 and 3, respectively. The decomposition efficiency was found to increase to 99.7%.

EXAMPLE 4

Example 2 was repeated in substantially the same manner as described except that 7.35 g of a 0.1% by weight aqueous hydrogen peroxide solution was additionally incorporated into the reactor. The treatment conditions and the results are summarized in Tables 2 and 3, respectively. The decomposition efficiency was found to increase to 98.8%.

EXAMPLE 5

A fly ash sample shown in Table 1 below was treated using oxygen gas as an oxidizing agent. Thus, the sample and water in amounts shown in Table 2 were charged in a reactor together with 5 atm of pure $O_2$ and heated at a temperature and a pressure as shown in Table 2 for a period of time as shown in Table 2. The reaction mixture was then analyzed for the amounts of polychlorodibenzo-p-dioxins and polychlorodibenzofurans to give the results summarized in Table 3. As a result of the 30 minutes heat treatment with supercritical water, 98.5% of the dioxins were decomposed.

TABLE 2

| Example No. | 1 | 2 | 3 | 4 | 5 |
|---|---|---|---|---|---|
| Temperature (K) | 673 | 673 | 673 | 673 | 673 |
| Pressure (MPa) | 30 | 30 | 30 | 30 | 30 |
| Time (minutes) | 15 | 30 | 30 | 30 | 30 |
| Amount of Sample (g) | 2.00 | 2.00 | 2.00 | 2.00 | 0.78 |
| Amount of Water (g) | 7.57 | 7.33 | 7.30 | 7.35 | 2.98 |
| Oxidizing Agent | none | none | $H_2O_2$ | $H_2O_2$ | $O_2$ |

TABLE 3

| Example No. | 1 | 2 | 3 | 4 | 5 |
|---|---|---|---|---|---|
| T4CDD | 1.1 | 1.2 | 0.035 | 0.10 | 0.27 |
| P5CDD | 0.26 | 0.25 | ND | 0.15 | 0.79 |
| H6CDD | 0.07 | 0.12 | 0.18 | 0.090 | 0.10 |

TABLE 3-continued

| Example No. | 1 | 2 | 3 | 4 | 5 |
|---|---|---|---|---|---|
| H7CDD | 0.075 | 0.035 | 0 | 0.265 | 0.15 |
| O8CDD | 0.05 | 0.085 | 0.025 | 0.030 | 0.04 |
| PCDD | 1.55 | 1.69 | 0.24 | 0.63 | 1.35 |
| PCDD Decomposition Efficiency (%) | 98.3 | 98.2 | 99.7 | 99.3 | 98.5 |
| T4CDF | 3.15 | 2.64 | 0.20 | 1.19 | 0.79 |
| P5CDF | 1.0 | 0.29 | 0.020 | 0.35 | 0.30 |
| H6CDF | 0.24 | 0.20 | 0.095 | 0.13 | 0.28 |
| H7CDF | 0.025 | 0 | 0 | 0 | 0.05 |
| O8CDF | 0.02 | 0.015 | 0.005 | 0 | 0 |
| PCDF | 4.43 | 3.14 | 0.32 | 1.67 | 1.42 |
| PCDF Decomposition Efficiency (%) | 95.2 | 96.6 | 99.7 | 98.2 | 98.5 |
| PCDD + PCDF Total Dioxin | 5.98 | 4.83 | 0.56 | 2.3 | 2.77 |
| Decomposition Efficiency (%) | 96.8 | 97.4 | 99.7 | 98.8 | 98.5 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of decomposing dioxin compounds contained in a solid combustion residue selected from the group consisting of ash and fly ash, comprising dispersing said combustion residue in water to form a dispersion and heating said dispersion at a temperature higher than the critical temperature of water and a pressure higher than the critical pressure of water to decompose the dioxin compounds.

2. A method as claimed in claim 1, wherein said treatment is performed at a temperature 653–873 K and a pressure of 22.12–40 MPa.

3. A method as claimed in claim 1, wherein said treatment is performed in the presence of an oxidizing agent.

4. A method as claimed in claim 3, wherein said oxidizing agent is hydrogen peroxide or an oxygen-containing gas.

5. A method as claimed in claim 1 wherein said combustion residue is fly ash.

6. A method as claimed in claim 1 wherein said heating is conducted for 10–40 minutes.

* * * * *